United States Patent [19]

Haslett et al.

[11] 4,036,538
[45] July 19, 1977

[54] TRACK SHOE BACK-BEND BUMPER

[75] Inventors: Glen M. Haslett, Peoria; Roger L. Boggs, East Peoria, both of Ill.

[73] Assignee: Caterpillar Tractor Co., Peoria, Ill.

[21] Appl. No.: 634,950

[22] Filed: Nov. 24, 1975

[51] Int. Cl.² .............................................. B62D 55/22
[52] U.S. Cl. ..................................................... 305/47
[58] Field of Search .................................... 305/47–49, 305/54, 43, 41; 74/247

[56] References Cited

U.S. PATENT DOCUMENTS 1,597,389   8/1926   Penn ........................................ 305/47
3,887,244   6/1975   Haslett et al. ........................... 305/57

Primary Examiner—Robert B. Reeves
Assistant Examiner—John P. Shannon
Attorney, Agent, or Firm—Phillips, Moore, Weisenberger, Lempio & Majestic

[57] ABSTRACT

A resilient element is associated with an overlapping portion of a crawler tractor track shoe so that the adjacent shoe initially contacts the resilient element during back-bend flexure prior to the grouser of this same adjacent shoe contacting the overlap portion of the first shoe. The resilient element, by reducing impact velocity, serves to lessen operating noise and prolong shoe life.

6 Claims, 8 Drawing Figures

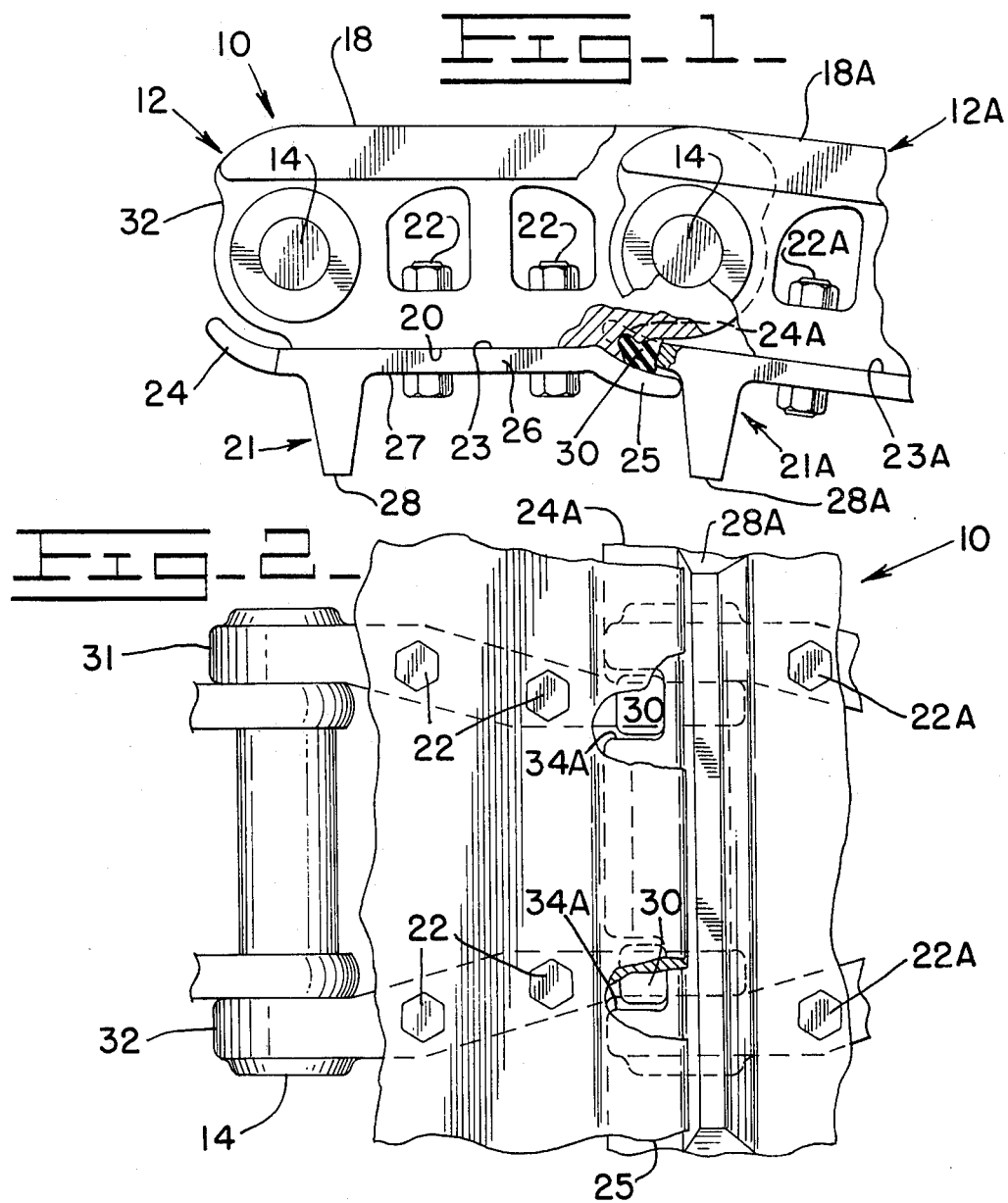
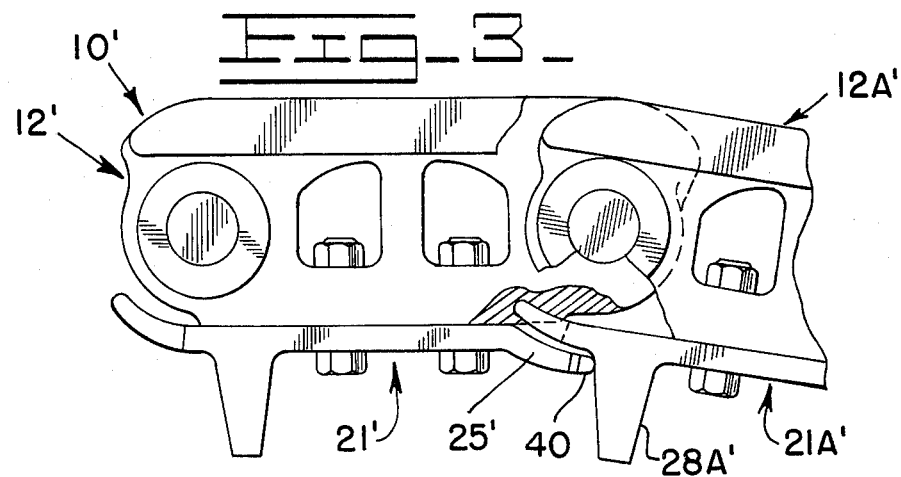

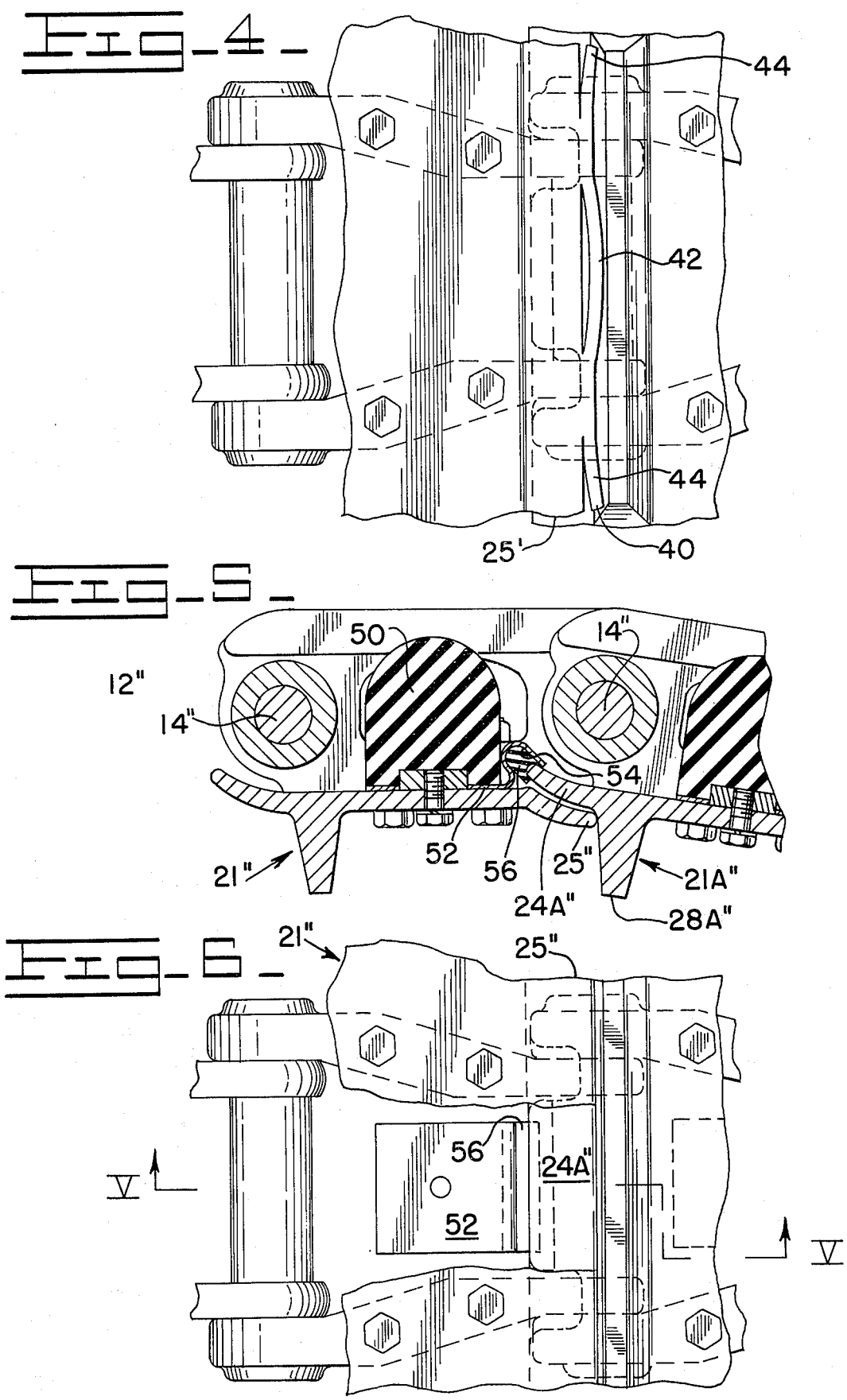

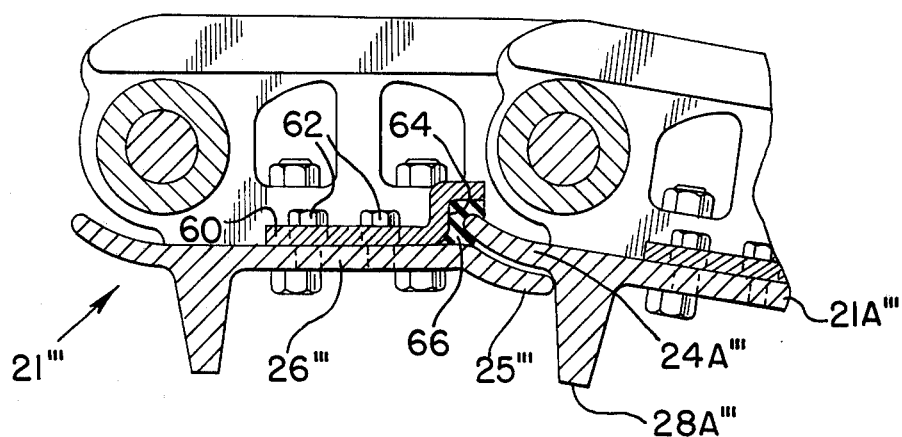
Fig_7_
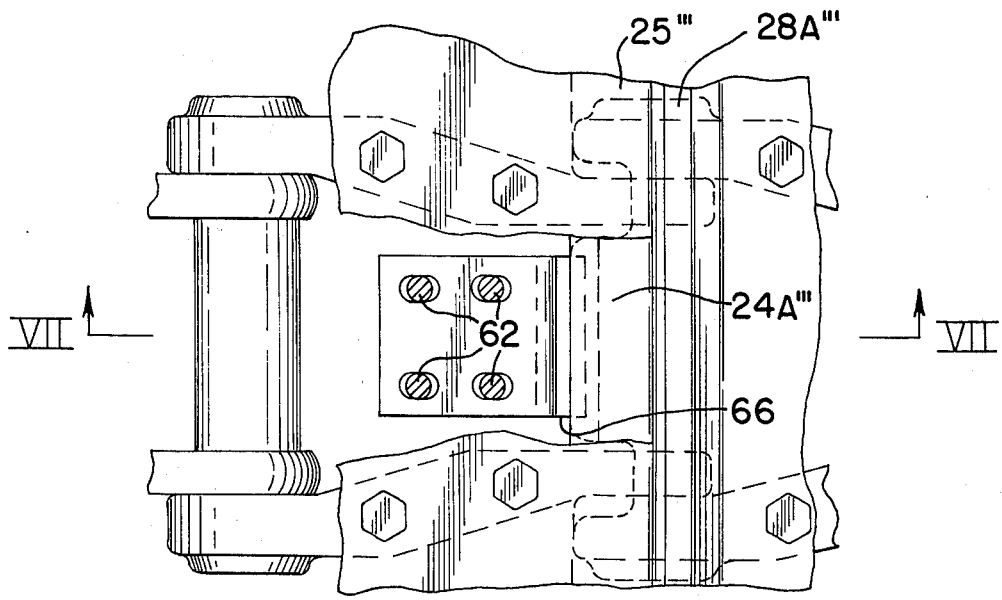
Fig_8_

TRACK SHOE BACK-BEND BUMPER

BACKGROUND OF THE INVENTION

This invention relates to endless tracks utilized on track-type vehicles. In particular, this invention relates to a resilient element and means for interposing the resilient element between adjacent track shoes which are removably affixed to links of an endless track. The resilient element serves to reduce impact velocity between adjacent shoe members during flexure of the track. Such reduction of impact velocity lessens impact shock resulting in a lower operating noise level. Further, the reduction of impact velocity tends to prevent slippage between the shoe and associated link, thus lessening shoe bolt loosening or breakage and, therefore, prolonging shoe life.

Conventional tracks utilized in track type vehicles comprise a series of links interconnected by hinge elements. Affixed to each link is a shoe having a cleat or grouser portion extending outwardly therefrom traction. The construction of the track allows it to flex in one direction as it is rotated by the sprocket about the track assembly. The track may also flex in the other or opposite direction to a limited degree as, for example, when the track contacts an obstruction and is urged inwardly of the track mechanism. Such flexure in this second opposite direction is usually limited by the overlap portion of one shoe contacting the grouser portion of the adjacent shoe. Such motion is known in the art as "back-bend" to the track. Back-bend motion, although necessary for proper operation of the vehicle, causes noise and increased wear to the shoe.

Noise problems created by the endless track moving over the drive sprocket and associated idler sprocket of a tractor have been long recognized and efforts to reduce noise from this source have been relatively successful by incorporation of resilient lugs interposed between the hinge pins of the endless track to reduce impact force of the hinge pins contacting the sprocket. Relatively successful efforts to eliminate noise and wear associated with the drive sprocket has brought to the forefront the noise problem associated with contact between adjacent shoes. By increasing the base size of these midpoint resilient lugs, as taught in U.S. Pat. No. 3,887,244, relative impact velocity during back-bend between adjacent shoes can be reduced in newer type track assemblies.

Although efforts to eliminate these sources of noise between the track and the drive sprocket and between adjacent shoes has markedly reduced the ambient noise level associated with operation of newer crawler tractors; local, state and federal regulations are imposing new and stricter noise limitations on construction type vehicles and the like; thus, diminution of noise associated with back-bend motion in track assemblies not readily modifiable to track assemblies with resilient mid-point lugs is appropriate.

SUMMARY AND OBJECTS OF THE INVENTION

Accordingly, the present invention provides a resilient element mounted adjacent the overlapping portion of one shoe to lessen impact velocity and resultant shock between adjacent shoes imparted during back-bend motion to an endless track assembly, such reduction of impact velocity reducing operating noise and lessening wear to the track shoe. Although metal-to-metal contact between adjacent shoes does occur, the relative velocity between the adjacent shoes is substantially lower. In minimizing the impact velocity between the adjacent shoe elements, the life of the shoe and the attaching bolts is increased by reduction of wear between the two elements. Thus, as a corollary to noise reduction, an additional benefit is realized in increased life of the shoe elements. Alternate embodiments of this invention include resilient elements of both elastomeric substance and metallic spring elements. Additionally, one embodiment is for use on newer endless tracks which incorporate resilient mid-point lugs interposed between hinge pins. In this alternate embodiment, the noise level, of course, reaches its lowest point, the noise associated with driving the endless track having been reduced by incorporating resilient lugs and further by this invention, the noise associated with back-bend motion being lessened.

It is therefore an object of this invention to provide an improved endless track assembly for track type vehicles which reduces noise production during operation and improves wear life of the various track components.

It is another object of this invention to provide a resilient back-bend bumper for endless track assemblies which reduces track noise and wear resulting from metal-to-metal impact of adjacent shoe members of the track during back-bend motion of the track.

It is another object of this invention to provide a resilient back-bend bumper for endless track assemblies having relatively low manufacturing costs.

It is an additional object of this invention to provide a resilient back-bend bumper for endless track assemblies which is easily installed and readily replaced.

It is still a further object of this invention to provide a resilient back-bend bumper which may be utilized in conjunction with an endless track incorporating resilient mid-point impact lugs affixed midway between hinge points.

These and other objects and advantages of the invention will be apparent from the following description and claims and the accompanying drawings which illustrate the preferred embodiments of the present invention.

BRIEF DESCRIPTION OF THE DRAWINGS

FIG. 1 is a side elevation view of a full link and a portion of the next adjacent link, each having a shoe affixed thereto, which form a portion of an endless track for use in crawler tractors and which incorporates the preferred embodiment of the resilient back-bend bumper which is the subject of this invention;

FIG. 2 is a plan view partially broken away of the embodiment illustrated in FIG. 1;

FIG. 3 is a side elevation view of the same portions of an endless track assembly as illustrated in FIG. 1, illustrating a second embodiment of this invention;

FIG. 4 is a plan view of the embodiment illustrated in FIG. 3;

FIG. 5 is a side elevation shown in cross-section of still another embodiment of this invention, particularly adapted to endless track assemblies incorporating a resilient mid-point impact lug;

FIG. 6 is an elevation view of the embodiment shown in FIG. 5;

FIG. 7 is a side elevation view shown in cross-section of the same portion of the representative endless track assembly showing still another embodiment.

FIG. 8 is a plan view partly broken away, showing the embodiment illustrated in FIG. 7.

DETAILED DESCRIPTION

Referring to FIG. 1, a portion 10 of an endless track used on a track-type vehicle is shown. The endless track includes a plurality of link assemblies 12 of which one full link assembly is shown and an additional adjacent link assembly is shown in part. Each link assembly 12 is interconnected to the next adjacent link assembly 12A by a hinge assembly 14 which may include a pin and associated bushings to allow flexing in one and the other direction between adjacent link assemblies. Hereafter, corresponding elements of the right link assembly 12A shown in FIG. 1 will carry the same number as the elements in the left link assembly and will be suffixed by the letter A. Additionally, each link assembly 12 has outer surfaces 20 to which a track shoe 21 having a link side 23 and a grouser side 27 may be affixed by appropriate fastening means here illustrated as bolts 22. Track shoe 21 serves as the bearing surface and source of traction for the associated vehicle during movement over the terrain. Additionally, track shoe 21 serves to prevent a certain amount of dirt from collecting between the hinge assemblies thereby impairing operation of the entire track assembly.

In order to further shield link assemblies 12 from contacting the terrain, each track shoe 21 is unitarily formed with an underlap portion 24 and an overlap portion 25, the overlap portion 25, as the name implies, overlapping underlap portion 24A of the next adjacent show 21A. A generally flat midportion 26 interconnects underlap portion 24 and overlap portion 25. In order to provide additional traction to the vehicle, each track shoe 21 has unitarily formed therewith, generally at the juncture of the underlap portion 24 and midportion 26, a grouser portion 28 extending outwardly from grouser side 27 of track shoe 21. Grouser portion 28 is shown in the embodiments described herein as extending across the surface of track shoe 21 having a generally quadrilateral cross section; however, it is to be understood that grouser portion 28 may take various shapes and forms.

Flex motion of the endless track is one of the most important features incorporated therein. Such motion is necessary to insure the endless track will properly rotate about the drive sprocket thus laying successive links on the terrain to provide forward motion to the vehicle. Flex motion about the drive socket results in the right link 12A (shown only in part in FIG. 1) pivoting relatively upwardly about hinge assembly 14 in relation to the left link 12 in FIG. 1. Flex motion about hinge assembly 14 in the other direction, or back-bend, that is the right link 12A pivoting downwardly as illustrated in FIG. 1, is limited by grouser portion 28A contacting overlap portion 25 of the adjacent shoe. As relative impact velocity increases between grouser portion 28A and overlap portion 25 of the adjacent shoe, noise of resulting contact increases.

In order to reduce impact velocity and thus noise of contact between grouser portion 28A and overlap portion 25 during the aforesaid back-bend flexing, resilient means are associated with overlap portions 25. In the preferred embodiment, a pair of resilient back-bend bumpers 30 are disposed between overlap portion 25 and the individual upstanding link members 31 and 32. Referring to FIG. 2, each underlap portion 24, particularly shown in FIG. 2 as underlap portion 24A, is formed with notches 34A in the edge thereof of sufficient size to retain resilient back-bend bumper 30 in a laterally spaced relationship adjacent to individual link members 31 and 32. Resilient back-bend bumper 30 may be generally of a rectangular shape as shown in FIG. 2 and is of sufficient size so that during back-bend flexure of adjacent link assemblies, underlap portion 24A must engage and compress resilient back-bend bumpers 30 before overlap portion 25 contacts grouser portion 28A. Such back-bend flexure is shown in FIG. 1 with resilient back-bend bumpers 30 compressed.

Resilient back-bend bumper 30 is readily inserted between overlap portion 25 and link members 31 and 32 either during assembly of the link assemblies and track shoes so that notches 34A properly mate therewith, or it may be replaced readily in the field by overflexing the endless track assembly in the opposite direction from the back-bend flexure thereby separating underlap portion 24A sufficiently from overlap portion 25 to open notches 34A. It should be noted that underlap portion 24A extends sufficiently under overlap portion 25 to retain resilient back-bend bumper 30 in notch 34A during normal flexure about the drive sprocket of the endless track assembly.

Operation of the perferred embodiment should be evident from the above-described structure; however, such operation of the resilient back-bend bumper will be reviewed. In an endless track assembly of which a portion 10 is shown in FIG. 1, flexure occurs in one direction as the endless track is driven about the drive sprocket of the associated vehicle. Such normal flexure occurs when adjacent track shoes 21 move relatively apart one from the other by pivoting action of the adjacent link assemblies 12 about hinge assembly 14. Flexure in the other opposite direction, that is, when adjacent track shoes 21 move relatively toward each other by pivoting motion of link assemblies 12 about hinge assembly 14, causes the underlap portion 24A of one track shoe to compress the resilient back-bend bumper 30 positioned between the overlap portion 25 of the next adjacent shoe and the link members 31 and 32 to which such track shoe 21 is affixed. Such compression of resilient back-bend bumper 30 serves to lessen the relative impact velocity between adjacent track shoes thereby reducing noise when grouser portion 28A contacts overlap portion 25 of the next adjacent shoe.

An alternate embodiment of the invention is illustrated in FIGS. 3 and 4. The structure of the portion of endless track 10 described above and herein designated portion 10' follows the structure of the primary embodiment discussed above. The motions associated with this and subsequent alternate embodiments are the same as that heretofore described, with normal flexure of the endless track assembly as it is driven about the drive sprocket occurring when the rightmost link 12A' as illustrated in FIG. 3 moves upwardly so that adjacent track shoes 21' pivotably move relatively apart. Back-bend flexure occurs when adjacent track shoes 21' pivotably move relatively together due to flexing motion about hinge assembly 14. The resilient means in this alternate embodiment is a bowed spring member 40 affixed to the edge of overlap portion 25' of each shoe. Bowed spring 40 is best seen in FIG. 4. The bowed spring is affixed to overlap portion 25' at two points, forming a curvilinear shape generally in the form of an archer's bow, the center 42 of the bow contacting grouser 28A' of the next adjacent shoe during back-bend flexure. The end portions 44 of the bowed spring 40 similarly contact grouser 28A' of the next adjacent shoe at or about the same time as center portion 42. In this embodiment bowed spring 40, although of metal, is resilient in nature and must be compressed during back-bend flexure thus fulfilling the objects of this invention to reduce impact velocity and consequent noise generation.

FIGS. 5 and 6 illustrate an alternate embodiment of this invention which is particularly adaptable to track assemblies in which resilient midpoint impact lugs have been incorporated. Although link assemblies 12" are generally of the form hereinbefore described, an additional element in the form of a resilient midpoint impact lug 50 has been included. Resilient midpoint impact lug 50 serves to lessen the impact force between the track assembly as it is driven about the drive sprocket by the midpoint impact lug contacting the drive sprocket before the hinge assemblies 14" make metal-to-metal contact with the sprocket and is the subject of U.S. Pat. No. 3,887,244. Track shoes 21" are generally, as hereinbefore described, without the bowed spring affixed to overlap portion 25". Thus, normal track shoes are sufficient for this embodiment. Interposed between resilient midpoint impact lug 50 and track 21 is a holder 52 which extends outwardly and upwardly from one side of resilient midpoint impact lug 50 in an S shape to form a longitudinal socket 54. Holder 52 with longitudinal socket 54 integrally formed therewith is positioned so that longitudinal socket 54 opens generally toward underlap portion 24A" of the adjacent track shoe. An elongated resilient back-bend bumper 56 is affixed in socket 54 so that back-band flexing, underlap portion 24A" of the next adjacent shoe must compress resilient back-bend bumper 56 before overlap portion 25" comes in contact with grouser portion 28A".

An additional alternate embodiment is depicted in FIGS. 7 and 8. Track shoes 21''' are of the form described immediately hereinbefore with no modification to either underlap portion 24''' or overlap portion 25'''. A holder 60 is affixed to midportion 26''' by appropriate fastening means herein depicted as bolts 62. Holder 62 affixed to the inner side of shoe 21''' extends upwardly of shoe 21''' and bends over to form an S shape, the S shape forming a channel 64 with midportion 26'''. Disposed in channel 64 is an elongated resilient back-bend bumper 66 extending generally longitudinally in channel 64. Resilient back-bend bumper 66 may be bondingly associated with holder 60 or may be affixed thereto by appropriate adhesive means. Resilient back-bend bumper 66 extends outwardly from channel 64 sufficiently so that initial contact between adjacent track shoes 21''' occurs when underlap portion 24A''' contacts resilient back-bend bumper 66. Further relative movement of one adjacent shoe 21A''' toward the next adjacent track shoe 21''' causes compression of resilient back bend bumper 66 thus lessening impact velocity between overlap portion 25''' and grouser portion 28A'''.

Operation of these various alternate embodiments follows that set forth relating to the preferred embodiment hereinbefore described. Generally, in all cases, initial contact between adjacent track shoes during back-bend flexure occurs when a portion of one shoe contacts the resilient bck-bend bumper of the next adjacent shoe, with compression of the resilient back-bend bumper required before hard metal-to-metal contact between adjacent shoes occurs. This compression of the resilient back-bend bumper associated with one track shoe lessens impact force between the two shoes during back-bend flexure.

Although this invention has been described and illustrated in the specification and accompanying drawings with respect to specific embodiments, modifications and changes may be made therein without departing from the true spirit and scope of the invention.

We claim:

1. In an endless track assembly including a plurality of links, each link having a pair of upstanding link elements; hinge means for separating each pair of upstanding link elements and interconnecting each pair of link element to an adjacent pair of link elements to allow flexure of said endless track in first and second directions; and a plurality of track shoes having a link side and a grouser side, each shoe removably affixed on the link side to a matching link, each track shoe defining an overlap portion at one end and an underlap portion at the opposite end, the overlap portion of one track shoe in overlapping relation with the underlap portion of the adjacent track shoe, said track shoes further having a grouser portion on the grouser side extending outwardly therefrom and adjacent to said underlap portion, with flexure in the first direction limited by the overlap portion of the one shoe engaging the grouser portion of the adjacent shoe, the improvement comprising resilient means associated with said overlap portion for lessening impact shock between said overlap portion of the one shoe and said grouser portion of the adjacent shoe during flexure in the first direction;

and further wherein said underlap portion of each adjacent track shoe comprises outwardly extending projections generally at right angles to said grouser and spatially separated to define a pair of notches, each of said notches aligned with a link element of the link associated with the said one track shoe and further wherein said resilient means comprises an elastomeric member removably disposed between the overlap portion of the one track shoe and the link element to which the said one track shoe is affixed, with a notch on the underlap portion of the adjacent track shoe surrounding said elastomeric member on three sides so that said underlap portion of the adjacent track shoe contacts and compresses said elastomeric shape during flexure in the first direction before said overlap portion of the one track shoe contacts the grouser portion of the said adjacent track shoe.

2. The combination set forth in claim 1 wherein said elastomeric member is of generally rectangular cross-section.

3. In an endless track assembly including a plurality of links, each link having a pair of upstanding link elements; hinge means for separating each pair of upstanding link elements and interconnecting each pair of link elements to an adjacent pair of link elements to allow flexure of said endless track in first and second directions; and a plurality of track shoes having a link side and a grouser side, each shoe removably affixed on the link side to a matching link, each track shoe defining an overlap portion at one end and an underlap portion at the opposite end, the overlap portion of one track shoe being in overlapping relation with the underlap portion of the adjacent track shoe, said track shoes further having a grouser portion on the grouser side extending outwardly therefrom and adjacent to said underlap portion, with flexure in the first direction limited by the overlap portion of the one shoe engaging the grouser portion of the adjacent shoe, the improvement comprising resilient means associated with said overlap portion of the one shoe for lessening impact shock between said overlap portion and said grouser portion of the said adjacent shoe during flexure in the first direction, and further wherein said resilient means comprises a bowed spring member affixed to the overlap portion of the one track shoe, the bowed spring member having a bow portion extending generally outwardly from said overlap portion in a direction generally toward the grouser portion of the said adjacent shoe so that said grouser portion compresses said bowed spring during flexure in the first direction.

4. The combination set forth in claim 3 wherein the bowed spring member is affixed to the overlap portion at two points, the bowed spring member having end portions extending outwardly toward the grouser portion of the said adjacent shoe from both points of fixture so that contact during flexure in the first direction between said grouser and said bowed spring member is at three points.

5. In an endless track assembly including a plurality of links, each link having a pair of upstanding link elements; hinge means for separating each pair of upstanding link elements and interconnecting each pair of link elements to an adjacent pair of link elements to allow flexure of said endless track in first and second directions; and a plurality of track shoes having a link side and a grouser side, each shoe removably affixed on the link side to a matching link, each track shoe defining an overlap portion at one end and an underlap portion at the opposite end, the overlap portion of one track shoe in overlapping relation with the underlap portion of the adjacent track shoe, said track shoes further having a grouser portion on the grouser side extending outwardly therefrom and adjacent to said underlap portion, with flexure in the first direction limited by the overlap portion of the one shoe engaging the grouser portion of the next adjacent shoe, and a plurality of resilient midpitch lugs removably affixed to the midpoint of each shoe and extending inwardly therefrom, the improvement comprising a holder element and an elastomeric strip; the holder element disposed between said shoe and said resilient midpitch lug and extending outwardly and upwardly from said resilient midpitch lug generally in a direction toward the overlap portion in an S shape, the upper loop of said S shape forming a groove proximate said overlap portion, with the opening of said groove facing the underlap portion of the said adjacent shoe; said elastomeric strip disposed in said groove to allow said underlap portion of the adjacent shoe to contact said elastomeric strip during flexure of the endless track assembly in a first direction before said overlap portion of the one track shoe contacts the grouser portion of the said adjacent shoe.

6. In an endless track assembly including a plurality of links, each link having a pair of upstanding link elements; hinge means for separating each pair of upstanding link elements and connecting each pair of link elements to an adjacent pair of link elements to allow flexure of said endless track in first and second directions; and a plurality of track shoes having a link side and a grouser side, each shoe removably affixed on the link side to a matching link, each track shoe defining an overlap portion at one end and an underlap portion at the opposite end, the overlap portion of one track shoe being in overlapping relation with the underlap portion of the adjacent track shoe, each of said track shoes having a grouser portion on the grouser side extending outwardly therefrom and adjacent to said underlap portion, with flexure in the first direction limited by the overlap portion of the one shoe engaging the grouser portion of the adjacent shoe, the improvement comprising a holder element and an elastomeric strip, said holder element affixed to the link side of the one track shoe, and having an end adjacent the overlap portion folded up and over generally in an S shape to form a channel with the said one track shoe in the vicinity of said overlap portion; said elastomeric strip disposed in said channel to allow the underlap portion of the adjacent shoe to contact and compress said elastomeric strip during flexure in the first direction before the overlap portion of the one track shoe contacts the grouser portion of the adjacent shoe.

* * * * *